(12) United States Patent
Tucholski

(10) Patent No.: US 6,206,938 B1
(45) Date of Patent: *Mar. 27, 2001

(54) SNAP-THROUGH GASKET FOR GALVANIC CELLS

(75) Inventor: Gary R. Tucholski, Parma Heights, OH (US)

(73) Assignee: Eveready Battery Company, Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,419

(22) Filed: May 26, 1999

Related U.S. Application Data

(62) Division of application No. 08/885,777, filed on Jun. 30, 1997, now Pat. No. 5,932,371.

(51) Int. Cl.[7] .............................. H01M 6/00; H01M 2/08
(52) U.S. Cl. ........................ 29/623.2; 429/185; 429/174
(58) Field of Search ........................ 29/623.2; 429/185, 429/174, 172, 224

(56) References Cited

U.S. PATENT DOCUMENTS 5,855,627 * 1/1999 Huhndorff et al. .
5,925,478 * 7/1999 Tucholski .

* cited by examiner

*Primary Examiner*—John S. Maples
(74) *Attorney, Agent, or Firm*—Robert W. Welsh; Stewart A. Fraser

(57) ABSTRACT

An electrochemical cell containing a snap-through sealing gasket that has a compressive preloading on a selected area of the snap-through gasket to prevent premature venting of the cell.

6 Claims, 2 Drawing Sheets

SNAP-THROUGH GASKET FOR GALVANIC CELLS

CROSS REFERENCE TO RELATED APPLICATION

The present application is a division of commonly owned U.S. patent application Ser. No. 08/885,777, filed Jun. 30, 1997, now U.S. Pat. No. 5,932,371, entitled "SNAP-THROUGH GASKET FOR GALVANIC CELLS."

FIELD OF THE INVENTION

The invention relates to a compressive preloaded snap-through gasket seal for galvanic cells and more particularly to a seal means for preventing premature release of gas pressure from inside the cells.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it may be resealable in order to avoid drying out of the electrolyte over the life of the cell and to prevent ingress of oxygen from the atmosphere which can cause wasteful corrosion of the anode.

In the past several different types of resealable pressure relief vent valves have been used for releasing high internal gas pressures from inside a sealed galvanic cell. One type of valve that has been commonly used consists basically of a valve member, such as a flat rubber gasket, which is biased into a sealing position over a vent orifice by means of a resilient member, such as a helical spring. The resilient member or spring is designed to yield at a certain predetermined internal gas pressure so as to momentarily relieve the seal and allow the gas to escape through the vent orifice.

Another type of resealable vent is disclosed in U.S. Pat. No. 3,451,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a pre-determined high internal gas pressure inside the container so as to momentarily break the seal and allow gas to escape through the vent orifice.

Alternates to high pressure resealable vent means are fail safe venting systems as illustrated in U.S. Pat. Nos. 3,218, 197 and 3,314,824. Specifically in the '197 patent a venting means is disclosed in which the seal gasket has a thin section that will rupture or "blow-out" at a predetermined high pressure buildup within the cell. The difficulty with this type of venting means is that for small diameter cells it is difficult to obtain consistency in the thickness of the "blow-out" section of the gasket using conventional manufacturing techniques. In the '824 patent a puncture-type safety seal is disclosed which comprises a spring washer positioned within the cell's seal assembly and a radially acting toothed puncture washer. The teeth of the washer slide relative to the spring washer when the spring washer is subjected to internal pressure so that at a predetermined gas pressure buildup, the teeth of the washer will puncture the seal's gasket thereby providing a vent passage. This type of venting means requires several component parts, is rather expensive to make and assemble, and is not suitable for small diameter cells.

U.S. Pat. No. 4,079,172 discloses sealed galvanic dry cells having at least one gas venting passage disposed at the interface of the top surface of the cover and then curled over the rim of the container. The passage is defined as being a recess in the cover disposed below the curled over rim and/or a notch in a portion of the curled over rim.

U.S. Pat. No. 5,227,261 relates to electrochemical cells which are comprised of a seal member that has a centrally located cylindrical hub joining a base, which base has a ventable diaphragm portion and a nonventable diaphragm portion, which hub has an end extending above the base and an end extending below the base, into which a current collector is inserted in an interference fit with the end extending above the base, which ventable diaphragm portion joins the hub at an interface forming an arc of between about 135 degrees and 250 degrees, and which interface is the thinnest portion of the base.

U.S. Pat. No. 4,255,499 relates to a galvanic cell in which a first arc portion between about 150° and 190° of the top peripheral edge of the container is turned or curled over the container's closure means so that when a predetermined high pressure build-up develops in the cell, the pressure will cause the closure means to tip or tilt about the diametral axis formed between the first arc portion and the remaining second arc portion so as to produce a vent passage at the interface of the container and the closure means proximal the remaining second arc portion of the top peripheral edge of the container.

As discussed above, resealable, high pressure relief vent valves are generally bulky and/or difficult to incorporate into a cell assembly, bulky type of blow-out safety vents are not suitable for small cell applications, while low pressure vent means are for some cell systems may not adequately and sufficiently prevent loss of electrolyte through leakage or prevent ingress of oxygen from the atmosphere which could cause wasteful corrosion of the anode.

It is, therefore, an important object of this invention to provide a compact and economical pressure vent for use in a galvanic cell that will effectively occupy minimum volume so that maximum volume of the cell can be used for the active components of the cell.

Still another object of this invention is to provide a predetermined pressure vent using a snap-through gasket for galvanic cells which is easy to produce and inexpensive to manufacture.

Another object of the present invention is to provide a vent which prevents premature release of gas pressure from within a galvanic cell.

The foregoing and additional objects will become more fully apparent from the following description and the accompanying drawings.

SUMMARY OF THE INVENTION

The invention relates to an electrochemical cell comprising an anode electrode, a cathode electrode and an electrolyte contained in a container, said container having an open end and a closed end and wherein the open end of the container is sealed with a gasket, said gasket comprising a base member having an upstanding peripheral wall and a centrally located upstanding wall forming a hub defining an opening; said base member having a first segment extending radially inward from the upstanding peripheral wall to a second segment disposed substantially in parallel to the upstanding wall of the hub, said second segment extending to a third segment disposed between the second segment and the upstanding wall of the hub, said third segment having a bowed surface facing the closed end of the container and having a notch, preferably on the inner surface of the third segment, and the bowed third segment provided with a compressive preload force in at least a portion of the area of the third segment, preferably between 10° to 360°, adjacent to the upstanding wall of the hub that will delay the onset of tensile stresses at the area adjacent the hub caused by any pressure buildup of gasses produced in the cell, so that premature venting of the cell can be prevented.

Preferably the cross-sectional area of the third segment adjacent the upstanding wall at the hub should have a thickness of between 1/8 and 3/4 of the thickness of the third segment between the second segment and the notch. The reduced area adjacent to the hub of the gasket will be in compression and therefore, absorb the initial low pressure of gas buildup within a cell, so that premature venting of the cell can be prevented. The thickness of the cross-sectional area adjacent to the first segment and the second segment has a thickness preferably between about 1¼ and 2½ times the cross-sectional thickness of the first segment. The cooperation of the first segment and the second segment provides a hinge type means so that radial forces applied to the peripheral wall of the gasket will be transferred via the first segment to the second segment, which in turn will cause transfer of force to the third segment. This force to the third segment will cause the third segment to bow inwardly due to the more flexible characteristics of the third segment provided by the notch in the internal surface of the third section. The notch or groove is provided to make the third section more flexible and will bow inwardly during the redrawing and/or crimping of the container onto the gasket. The bowing of the third section will provide a compressive force on the area of the third section adjacent to the wall of the hub. After the final assembly of the cell, the third segment of the gasket will be in a compressive preloading in the vent corner or area adjacent to the hub that will delay the onset of tensile stresses upon the gasket. The gasket will be able to tolerate a predetermined pressure buildup within the cell to prevent premature venting but upon a high pressure buildup within the cell, the third section of the gasket is designed to provide a snap-through feature so that the third segment will snap from a convex bow design facing the closed end of the container to a convex bow design facing the open end of the container. The novel snap-through feature of the gasket provides a construction that would occupy minimum internal volume due to the minimum height of the gasket so that maximum internal volume can be used for the active components of the cell. Thus, with the novel construction of the gasket of this invention, the cell pressure on the gasket can be increased without the venting of the cell. This feature can be accomplished with a combination of compressive preloading and the creation of the snap-through behavior of the third segment of this gasket.

The gasket of this invention is constructed with several segments that cooperate during the assembly of the cell to place a compressive preload in a segment of the gasket that will delay the onset of tensile stresses in the vent area of the gasket and therefore prevent premature venting of the cell. It has been found that using the novel gasket of this invention, the onset of tensile stresses can be prevented, if desired, up to about 200 psi internal pressure for C-size cells. Cell closing may increase compression in the reduced area of the gasket adjacent the hub.

The purpose of the compressive preloading is to eliminate tensile stress as at the inside angle formed by the junction of the third segment and the wall of the hub under normal operating pressures. In the assembled cell the area of the gasket adjacent to the hub is in compression. As the internal pressure is increased, the inside angle, defined as the angle between the area adjacent the hub and the wall of the hub, passes through 90 degrees.

The thickness of the reduced area in the third segment is preferably between 1/8 to 3/4 times the cross-sectional average thickness of the third segment disposed between the notch and the second segment.

The upstanding wall of the hub can be provided with a flange to accommodate the centrally disposed edge of the cover (inner cover) of a cell. Also the upstanding peripheral wall of the gasket could be provided with a flange to accommodate the peripheral edge of the inner cover. If desired, a rib or rim could be disposed on the upstanding peripheral wall of the gasket to secure the peripheral edge of the inner cover onto the first and second segments of the gasket.

Preferably, an inner cover having an opening to accommodate the hub is disposed within the peripheral wall and is secured between the peripheral wall and the hub of the seal assembly.

Preferably, the gasket in conjunction with the cover are secured to the container by redrawing and/or crimping the rim of the container against the gasket and the cover. In this embodiment, the gasket which is generally a nonconductive synthetic material, will act as an insulator as well as a barrier to air and moisture and will be strong enough to maintain its sealing after it has been physically abused such as by dropping or exposure to vibration and/or subject to extreme variations in temperature and/or humidity and/or abuse charging.

Cylindrical alkaline cells are generally comprised of a containment means and the components located within the containment means. The containment means comprises an elongated container, that is open on one end, and a vent assembly. The assembly is made up of a terminal cover plate; an elastomeric gasket; and an inner cover and current collector. The members of the vent assembly are inserted into the open end of the container thereby sealing the container. The rim portion of the container is then redrawn and/or crimped inwardly to form a seal.

The sealing gasket of this invention comprises a material selected with consideration given to its stability in the presence of the electrolyte, its resiliency, and its resistance to cold flow. Suitable polymeric materials are selected from the group consisting of nylon, polytetrafluoroethylene, fluorinated ethylene-propylene, chlorotrifluoroethylene, perfluoro-alkoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating the flange of the gasket surfaces with an adhesive agent such as a fatty polyamide resin or asphalt. The sealing gasket of this invention is suitable for production techniques such as injection molding. The configuration of the surfaces of the gasket flanges is well suited for ease of removal from dies, punches and the like. Preferably the gasket would be nylon. The terminal cover should be made of a conductive material that will not corrode or otherwise deteriorate when in contact with the materials of the cell. The container for the cell could be made of stainless steel, iron, nickel, nickel-plated steel, or some other conductive material.

The invention also relates to a method for making a galvanic dry cell having a pressure vent closure with a safety feature that prevents premature venting of a cell which comprises the steps:

(a) placing within a conductive container a separator, an anode, a cathode, and an electrolyte;

(b) preparing a gasket comprising a base member having an upstanding peripheral wall and a centrally located upstanding wall forming a hub defining an opening, said base member having a first segment extending radially inward from the upstanding peripheral wall to a second segment disposed substantially parallel to the upstanding wall of the hub, said second segment extending to a third segment disposed between the second segment and the upstanding wall of the hub, said third segment being bowed so that it faces the closed end of the container and having a notch, and the bowed third segment being provided with a compressive preload force in the area of the third segment adjacent to the upstanding wall of the hub that will delay the onset of tensile stresses at the area adjacent the hub caused by any pressure buildup of gasses produced in the cell, so that premature venting of the cell can be prevented;

(c) assembling an inner cover, the gasket and a current collector into the container; and (d) reducing the top edge portion of the container over the peripheral wall of the gasket onto the inner cover to provide a sealed cell, and wherein said area adjacent the hub is in a compressive preloading stress state. As used herein, the term reducing the top edge portion of the container shall mean a redrawing step, a crimping step or any other step that will impact a compressive force on the reduced thickness of the gasket.

The notch in the third segment is preferably located between ¼ and ¾ the length of the third segment and more preferably between ⅓ to ⅔ of the length of the third segment.

BRIEF DESCRIPTION OF THE DRAWINGS

The present invention will become more apparent from the following description thereof when considered together with the accompanying drawings which are set forth as being exemplary of the embodiments of the present invention and is not intended in any way to be limitative thereof and wherein.

DETAILED DESCRIPTION OF THE PREFERRED EMBODIMENT

Figure 1:
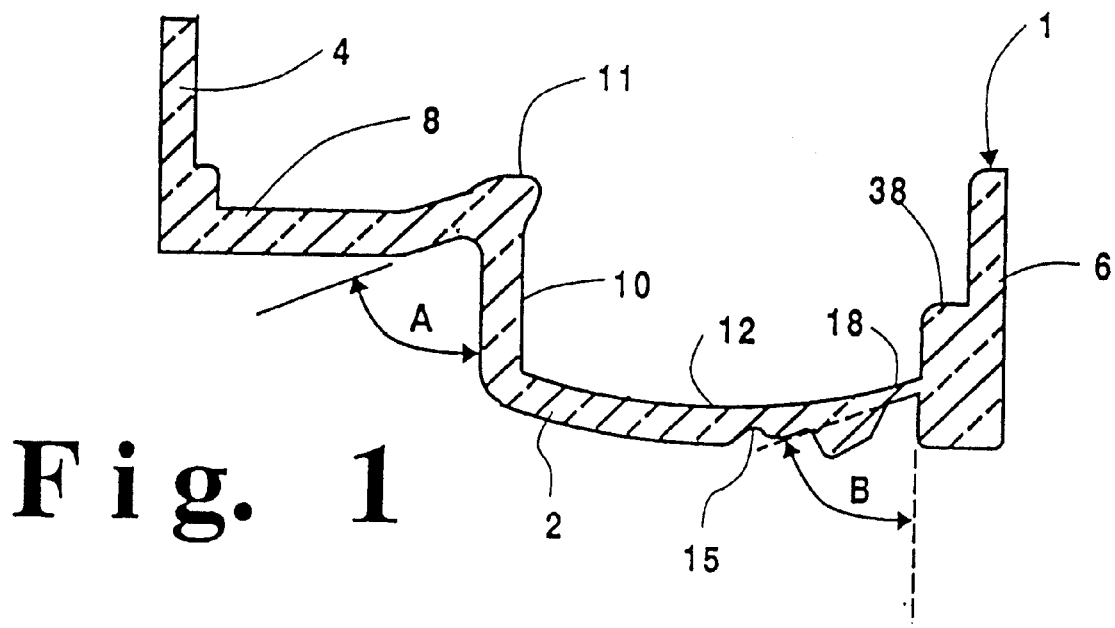
FIG. 1 is a partial cross section of a gasket for use in a cell.
Figure 3:
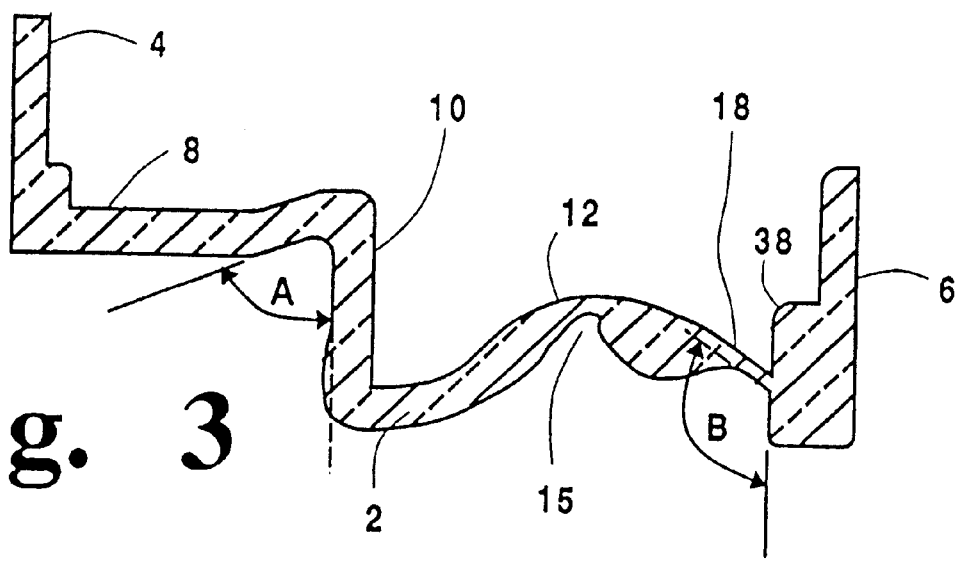
FIG. 3 is a partial cross section of a deformed gasket after being exposed to high internal pressure.
Figure 2:
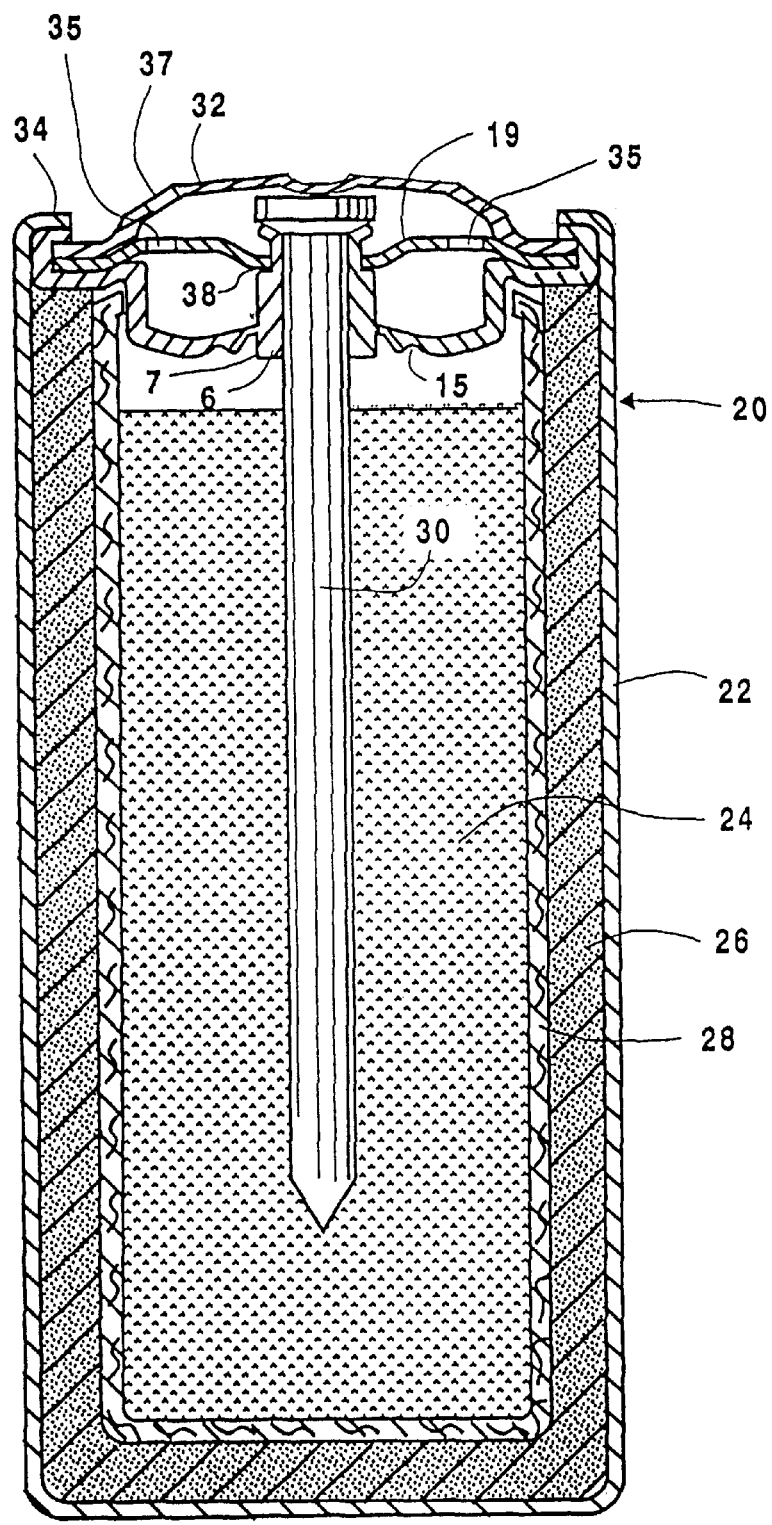
FIG. 2 is a sectional elevation of the gasket means of FIG. 1 shown after assembled in a galvanic cell.

Referring to FIGS. 1–3, there is shown gasket 1 comprising a base member 2 with an upstanding peripheral wall 4 and an upstanding centrally located cylindrical hub 6. Disposed in the base member 2 between the upstanding peripheral wall 4 and hub 6 is a first segment 8, a second segment 10, and third segment 12. The angle A formed by first segment 8 and second segment 10 is shown as about 70°. A flange 38 is shown and is designed to support inner cover 19, as shown in FIG. 2. As shown in FIG. 1, the thickness of section 11 is about 1½ times the thickness of the first segment 8. FIG. 2 shows the gasket of FIG. 1 assembled in a galvanic cell 20. The inside of angle B as shown in FIG. 1 is about 80° formed between the reduced area segment 18 and the wall 7 of hub 6. A notch 15 is shown in the third segment 12 of the gasket 1. This notch 15 is provided to make the third section 12 more flexible and will bow inwardly during the redrawing or crimping of the container onto the gasket. The bowing of the third section 12 will provide a compressive force on the reduced thickness portion 18 of the third section 12 adjacent to the hub.

FIG. 2 shows an assembled alkaline manganese dioxide-zinc cell 20 comprising container 22 having disposed therein an anode mix 24 and cathode 26 separated by a separator 28. The anode mix 24 could comprise particulated zinc with a gelling agent and an electrolyte, such as aqueous potassium hydroxide. The cathode could comprise manganese dioxide and a conductive material, such as graphite. As shown in FIG. 2, the gasket 1 of FIG. 1 is positioned within the open end of the container 22 where the gasket 1 rests on the cathode 26. If desired, a layer of sealant may be disposed at the interface of the seal and the container. Upon inserting gasket 1, cover 19 and current collector 30 in container 22, current collector 30 made good electrical contact in the anode mix 24. Once the gasket 1 is seated within container 22, and the cover 19 is seated within gasket 1, a terminal cover 32 is disposed over the current collector 30, and then the annular edge segment 34 of container 22 is radially compressed and crimped against the gasket 1, cover 19, cover 32, thereby radially sealing the gasket 1 to the opening of the container 22.

The inner cover 19 is designed to seat within seal gasket 1 on flange 38 of wall 7 of hub 6. An opening 35 is disposed in inner cover 19 and an opening 37 is disposed in terminal cover 32 to permit the internal pressure to vent.

As shown in FIG. 2, the reduced area of the third segment 12 of the gasket 1 is put under a compressing stress during the redrawing and/or crimping step. This preloading stress on the gasket delays the onset of tensile stresses in the reduced area to prevent premature venting of cell. FIG. 3 shows the gasket 1 of FIGS. 1 and 2 after being subjected to a high pressure force from within the cell that invert the third segment 12 outwardly and places the reduced area 18 in tension. If the pressure buildup is severe, the gasket will snap through to permit venting.

It is to be understood that other modifications and changes to the preferred embodiment of the invention herein shown and described can also be made without departing from the spirit and scope of the invention.

The invention claimed is:

1. A method for making a galvanic dry cell having a pressure vent closure with a safety feature that prevents premature venting of the cell which comprises the steps:

(a) placing within a conductive container a separator, an anode, a cathode, and an electrolyte, said conductive container having an open end and a closed end;

(b) preparing a gasket comprising a base member having an upstanding peripheral wall and a centrally located upstanding wall forming a hub defining an opening, said base member having a first segment extending radially inward from the upstanding peripheral wall to a second segment disposed substantially parallel to the upstanding wall of the hub, said second segment extending to a third segment disposed between the second segment and the upstanding wall of the hub, said third segment having an inwardly bowed surface facing the closed end of the container and having a notch, wherein the inwardly bowed surface of the third segment inverts to an outwardly bowed surface upon experiencing a high pressure buildup within the container, said bowed third segment being provided with a compressive preload force in at least a portion of the area of the third segment adjacent to the upstanding wall of the hub that will delay the onset of tensile stresses at the area adjacent the hub caused by any pressure buildup of gasses produced in the cell, so that premature venting of the cell can be prevented;

(c) assembling an inner cover, the gasket and a current collector into the container; and (d) reducing the top edge portion of the container over the peripheral wall of the gasket onto the inner cover to provide a sealed cell, and wherein said reduced area is in a compressive preloading stress state.

2. The method of claim 1 wherein in step (d) the reducing procedure is a redrawing procedure.

3. The method of claim 1 wherein step (d) the reducing procedure is a crimping procedure.

4. The method of claim 2 wherein in step (d) a crimping procedure is also applied.

5. The method of claim 1 wherein the gasket is made of material selected from the group consisting of nylon, polytetrafluoroethylene, fluorinated ethylene-propylene, chlorotrifluorethylene, perfluoro-alkoxy polymer, polyvinyls, polyethylene, polypropylene and polystyrene.

6. The method of claim 1 wherein the anode is comprised of zinc, the cathode is comprised of manganese dioxide, and the electrolyte is potassium hydroxide.

* * * * *